United States Patent [19]
Esser

[11] Patent Number: 5,659,464
[45] Date of Patent: Aug. 19, 1997

[54] FILTER FOR PULSE WIDTH MODULATING INVERTER

[75] Inventor: Albert Andreas Maria Esser, Niskayuna, N.Y.

[73] Assignee: General Electric Company, Schenectady, N.Y.

[21] Appl. No.: 620,400

[22] Filed: Mar. 22, 1996

[51] Int. Cl.$^6$ ..................................................... H02M 1/12
[52] U.S. Cl. .............................................. 363/41; 323/232
[58] Field of Search ............................ 323/232; 363/41, 363/132; 315/307

[56] References Cited

U.S. PATENT DOCUMENTS

| | | | |
|---|---|---|---|
| 3,544,855 | 12/1970 | Friedlander et al. | 323/206 |
| 5,047,910 | 9/1991 | Levran et al. | 363/41 |
| 5,526,252 | 6/1996 | Erdman | 363/41 |
| 5,567,994 | 10/1996 | Davis et al. | 363/41 |

OTHER PUBLICATIONS

"Active Filter Design and Specification for Control of Harmonics in Industrial and Commercial Facilities" By Serge Bernard, et al, Power Quality Solutions, Sep. '1995 Proceedings, pp. 197–209.

*Primary Examiner*—Stuart N. Hecker
*Attorney, Agent, or Firm*—Ann M. Agosti; Marvin Snyder

[57] ABSTRACT

A filter for a pulse width modulating inverter comprises a first inductor coupled to a phase connection of the pulse width modulating inverter, a second inductor coupled between the first inductor at a first-second coupling junction and a load, and a series configuration comprising a resistor and a capacitor coupled in series. The series configuration has one end coupled to the first-second coupling junction. If desired, the first inductor can be coupled between a phase connection of the pulse width modulating inverter and directly to the load, and the series configuration can have one end coupled to the load. The series configuration can further include a third inductor. Furthermore, the series configuration can be replaced by a parallel configuration comprising a resistor and a capacitor coupled in parallel, and the parallel configuration can further include a third inductor coupled in series to the resistor and the capacitor coupled in parallel. A second end of the series configuration can be coupled to a neutral or, if the filter includes a fourth inductor coupled to a second phase connection and a fifth inductor coupled between the fourth inductor at a fourth-fifth coupling junction and the load, the second end can be coupled to the fourth-fifth coupling junction. The filter can be used in single phase or multi-phase applications.

10 Claims, 5 Drawing Sheets

FILTER FOR PULSE WIDTH MODULATING INVERTER

BACKGROUND OF THE INVENTION

Conventional three phase pulse width modulating (PWM) inverters include an inductor between the power switches (such as IGBTs) and the connection to a utility. A PWM inverter produces rectangular wave-shaped output voltages having high distortions, especially at frequencies that are plus or minus the modulated fundamental frequency away from the switching frequency.

For applications such as active power filters or uninterruptable power supplies, the voltage and current distortion must be minimized. In particular, when connecting an inverter to a utility grid, for example, high frequency current distortions must be suppressed to prevent the hazard of machinery destruction.

One approach to distortion reduction is described by S. Bernard et al., "Active Filter Design and Specification for Control of Harmonics in Industrial and Commercial Facilities," Power Quality Solutions, September 1995 Proceedings, pp. 197–209. Bernard et al. insert, between the PWM inverter and the load, an interface filter comprising an L(inductor)-C(capacitor)-L(inductor) filter. The inductors are coupled together with one inductor coupled to the PWM inverter and the other inductor coupled to the load. The capacitor is coupled between a coupling junction of the two inductors and a neutral. The harmonic current to be canceled shows up as reactive power, and a decrease in the harmonic voltage distortion occurs because the harmonic currents flowing through the source impedance are reduced. The inductor coupled to the inverter provides a large isolation inductance to convert the voltage signal created by the inverter to a current signal for canceling harmonics, the capacitor provides signal smoothing, and the inductor coupled to the load provides isolation for high frequency components. The technique of Bernard et al., however, does not compensate for stray inductances or for non-linear loads that may excite the filter externally.

SUMMARY OF THE INVENTION

It would be desirable to have a filter for suppressing switching frequency distortion and increasing the effectiveness of the operation of a pulse width modulating inverter.

Briefly, according to one embodiment of the present invention, a filter for a pulse width modulating inverter comprises a first inductor coupled to a phase connection of the pulse width modulating inverter, a second inductor coupled between the first inductor at a first-second coupling junction and a load, and a series or parallel configuration comprising a resistor and a capacitor and having one end coupled to the first-second coupling junction. If desired, the second inductor can be eliminated with the first inductor then being coupled between a phase connection of the pulse width modulating inverter and directly to the load and the series configuration having one end coupled to the load. The series or parallel configuration can further include a third inductor.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
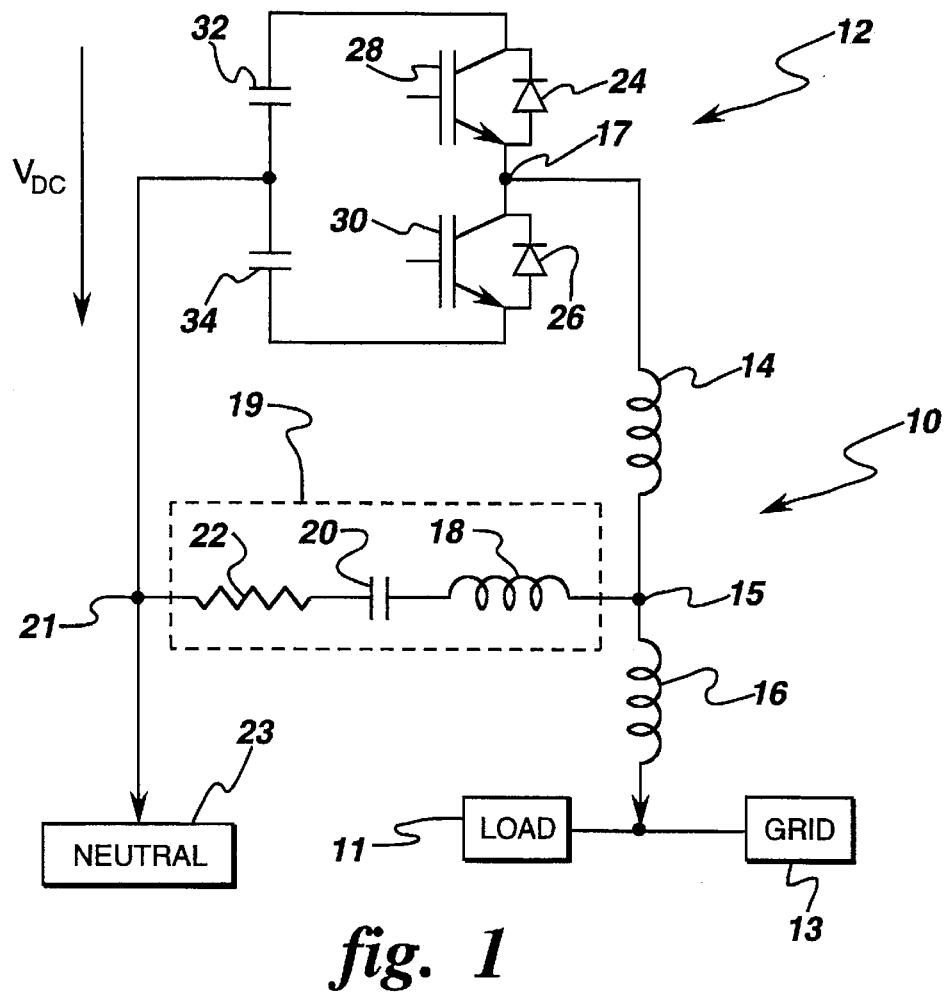
FIG. 1 is a circuit diagram of a single phase, half bridge embodiment of the present invention.

FIG. 1 is a circuit diagram of a single phase, half bridge embodiment of the present invention. A filter 10 for a pulse width modulating inverter 12 includes a first inductor 14, a second inductor 16, and a series configuration 19 comprising a third inductor 18, a resistor 22, and a capacitor 20 coupled in series.

First inductor 14 is coupled to pulse width modulating (PWM) inverter 12 at a phase connection 17. In the embodiment of FIG. 1, the PWM inverter comprises two capacitors 32 and 34 coupled in series together and to two switch-diode pairs comprising anti-parallel diodes 24 and 26 and switches 28 and 30. The first inductor is coupled between the two switch-diode pairs at phase connection 17. Switches 28 and 30 may comprise transistors such as IGBTs (insulated gate bipolar transistors), MOSFETs (metal-oxide-semiconductor field effect transistors), MCTs (MOS controlled transistors), and BJTs (bipolar junction transistors), for example.

Second inductor 16 is coupled to the first inductor at a first-second coupling junction 15 and coupled to a load 11 and a power supply grid 13. The series configuration 19 has one end coupled to first-second coupling junction 15. The other end may be coupled in one of several manners, as discussed below.

The relative positioning and coupling order of resistor 22, capacitor 20, and third inductor 18 is not critical to the present invention; these components can be arranged in series in any order. In the embodiment of FIG. 1, a second end 21 of series configuration 19 is coupled to a neutral point 23 of the source.

First inductor 14 is used to control the current from the PWM inverter. The second inductor's inductance value depends upon the transformer used in the power supply grid, and is typically in the range of 20 to 50 microhenrys. The filter is very robust in accommodating variations (such as ±50%) of the grid inductance. The second inductor thereby creates the needed impedance to limit high frequency currents from the grid and load from passing back into series configuration 19. In the event that a user is the only user on a particular power feed, and the user plans to generate only sign waves, second inductor 16 can be eliminated due to the integral inductance of the power supply transformer.

The switching frequency and higher order distortions are effectively suppressed by series configuration 19 which acts as an LCR (inductor/capacitor/resistor) trap. Resistor 22 has a resistance sufficient to ensure wide range damping without compromising the dynamic response or damping the switching frequency. Capacitor 20 removes ringing problems and permits high switching frequency currents to bypass the filter. Third inductor 18 provides a series resonant circuit with zero impedance at the point of resonance. First inductor 14, third inductor 18, capacitor 20, and resistor 22 are preferably tuned to the PWM inverter switching frequency.

Figure 1A:
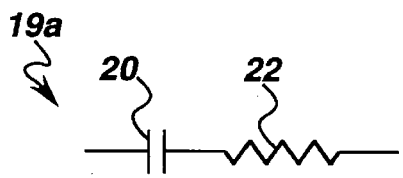
FIGS. 1a–1c are alternative embodiments for a portion of the filter shown in FIG. 1.
Figure 1B:
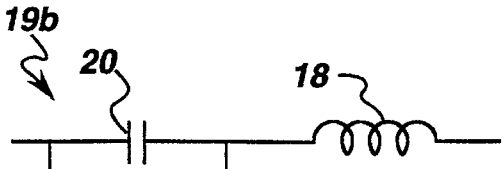
Figure 1C:
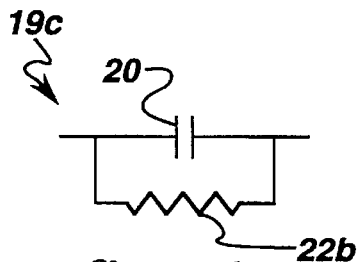

FIGS. 1a–1c are alternative embodiments for the series configuration 19 shown in FIG. 1. In FIG. 1a, a series configuration 19a comprises capacitor 20 and resistor 22 without any third inductor. Without a third inductor, the total filter impedance falls with 60 decibels per decade after the resonance point (shown as point B in FIG. 5 below). Series configuration 19a will act as a sink for various types of harmonics present in the grid.

In FIG. 1b, a parallel configuration 19b comprises a paralleled combination of capacitor 20 and resistor 22b, with the parallel combination coupled in series with inductor 18. In this embodiment, the power consumption of the resistor is extensive, and, for the fundamental (typically 60 hertz), the full voltage is across the resistor ($P=V^2/R$).

In FIG. 1c, a parallel configuration 19b comprises capacitor 20 and resistor 22b in parallel without the third inductor 18 of FIG. 1b. This embodiment has similar limitations to those discussed with respect to FIGS. 1a and 1b.

Figure 2:
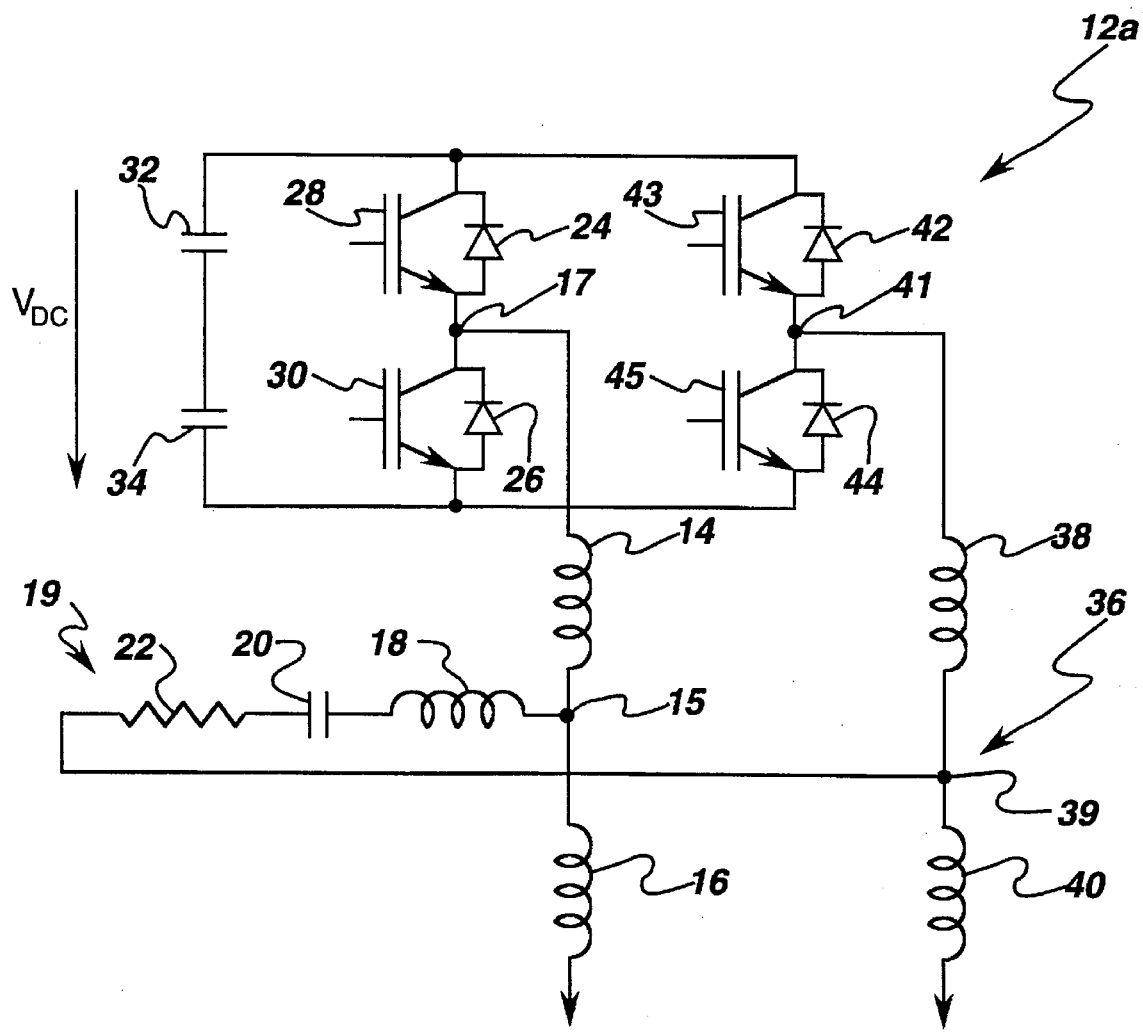
FIG. 2 is a circuit diagram of a single phase, H bridge embodiment of the present invention.

FIG. 2 is a circuit diagram of a single phase, H bridge embodiment of the present invention. In this embodiment a filter 36 includes a fourth inductor 38 and fifth inductor 40 having a fourth-fifth coupling junction 39 and being coupled between additional switch (43 and 45)-diode (42 and 44) pairs at a second phase connection 41 of PWM inverter 12a and the load and grid, as discussed with respect to and shown in FIG. 1. The series configuration 19 of third inductor 18, capacitor 20, and resistor 22 has its second end coupled to the fourth-fifth coupling junction 39. The circuit of FIG. 2 operates in a similar manner as the circuit of FIG. 1 with the series configuration acting as a trap for both phase connections 17 and 41 of the PWM inverter.

Figure 3:
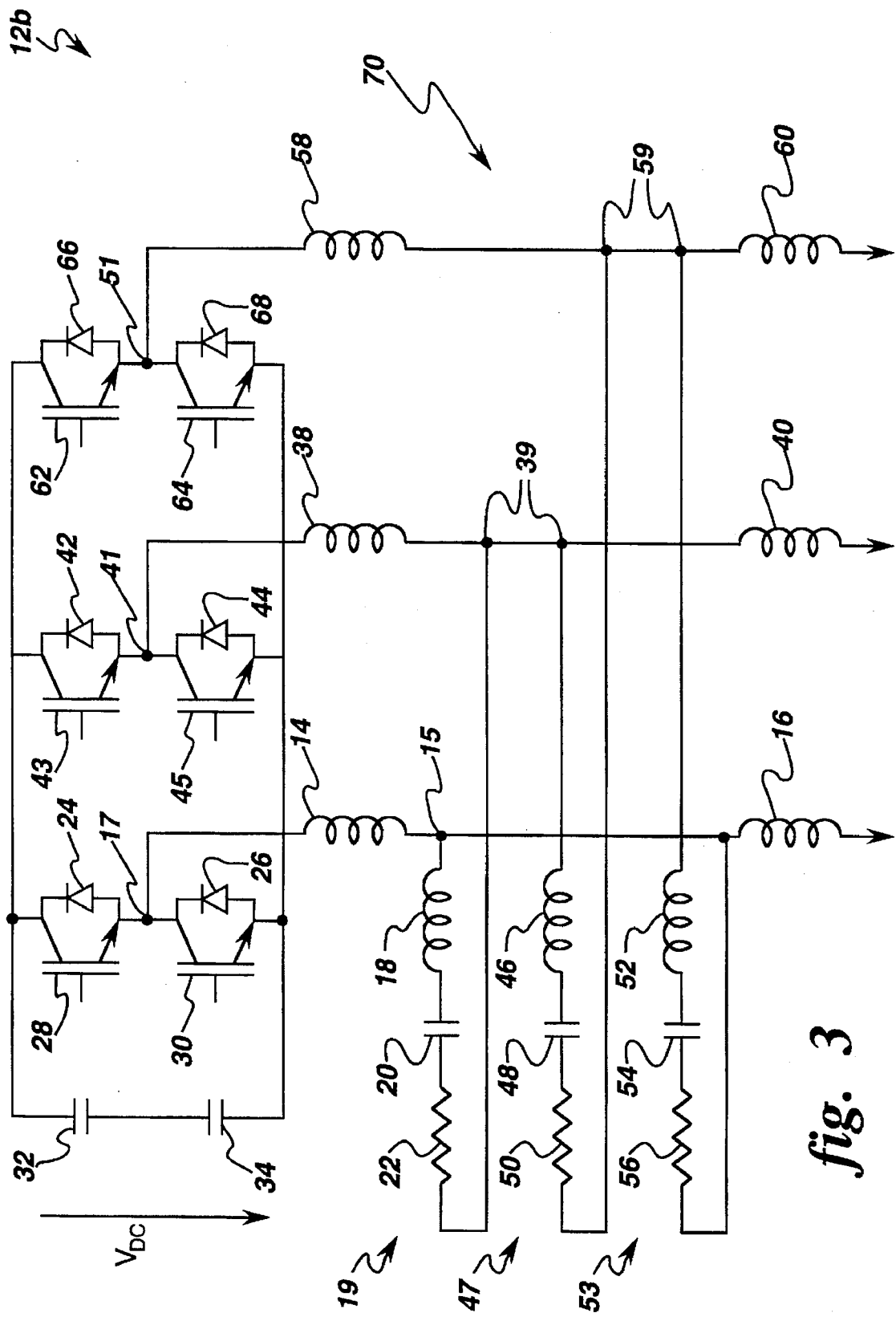
FIG. 3 is a circuit diagram of a three phase, delta connected embodiment of the present invention.

FIG. 3 is a circuit diagram of a three phase, delta connected embodiment of the present invention. In this embodiment, which is an extension of the H bridge embodiment of FIG. 2, a filter 70 includes a sixth inductor 58 and seventh inductor 60 having a sixth-seventh coupling junction 59 and being coupled between additional switch (62 and 64)-diode (66 and 68) pairs at a third phase connection 51 of PWM inverter 12b and the load and grid (shown in FIG. 1).

Furthermore, two additional series configurations are included. A second series configuration 47 includes an eighth inductor 46, a second resistor 50, and a second capacitor 48 coupled in series. A first end of the second series configuration is coupled to fourth-fifth coupling junction 39 while a second end of the second series configuration is coupled to sixth-seventh coupling junction 59.

A third series configuration 53 includes a ninth inductor 52, a third resistor 56, and a third capacitor 54 coupled in series. The third series configuration has a first end coupled to sixth-seventh coupling junction 59 and a second end coupled to first-second coupling junction 15.

Figure 4:
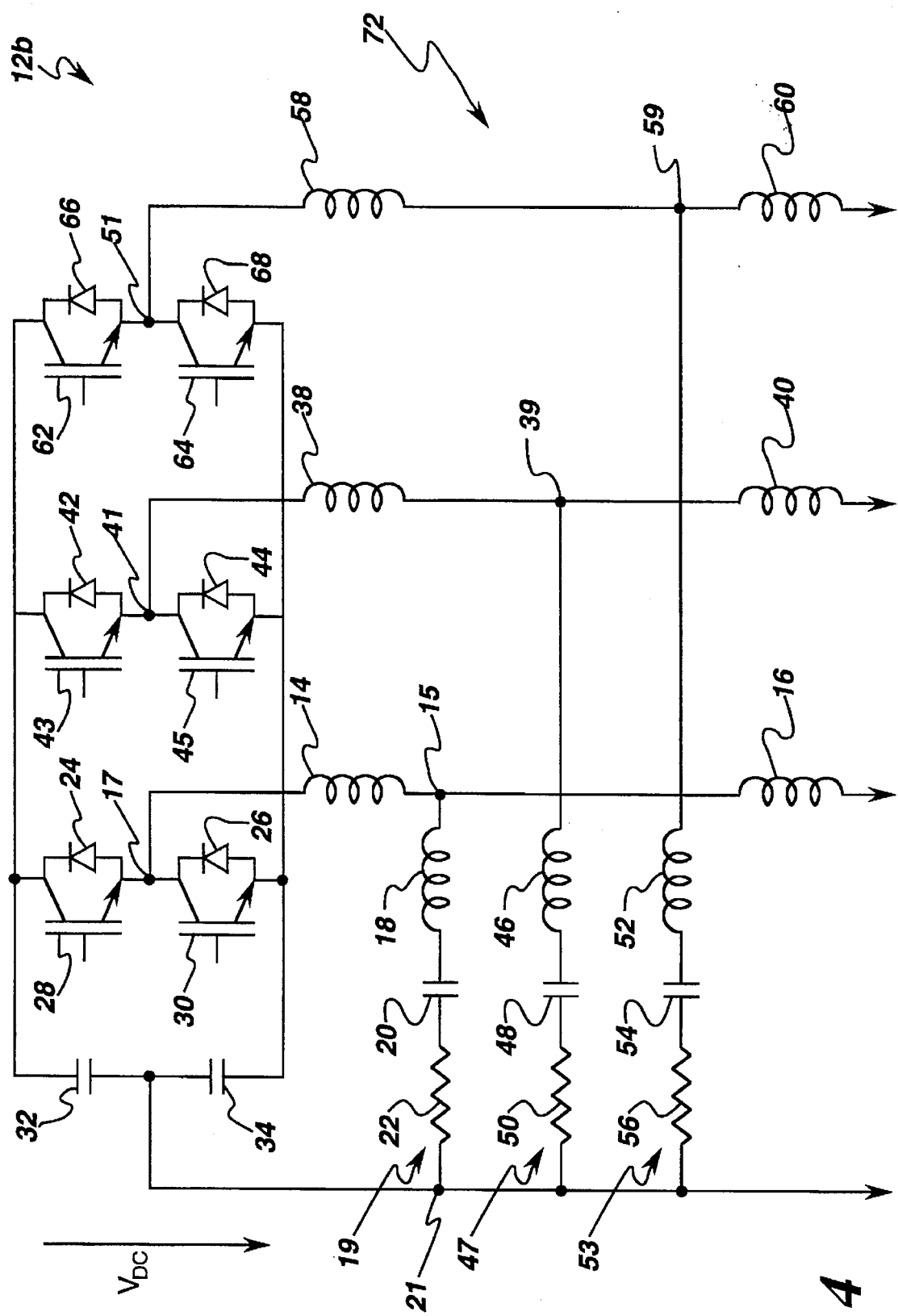
FIG. 4 is a circuit diagram of a three phase, y connected embodiment of the present invention.

FIG. 4 is a circuit diagram of a three phase, y connected embodiment of the present invention. This embodiment, which is an extension of the single phase half bridge system of FIG. 1, includes the elements discussed with respect to FIGS. 1–3, with series configurations 19, 47, and 53 being coupled differently in FIG. 4 than in FIG. 3.

As in FIG. 3, a first end of series configuration 19 of a filter 72 is coupled to first-second coupling junction 15, a first end of second series configuration 47 is coupled to fourth-fifth coupling junction 39, and a first end of third series configuration 53 is coupled to sixth-seventh coupling junction 59. The second ends of each of series configurations 19, 47, and 53, however, are each coupled to the neutral (shown in FIG. 1).

Figure 5:
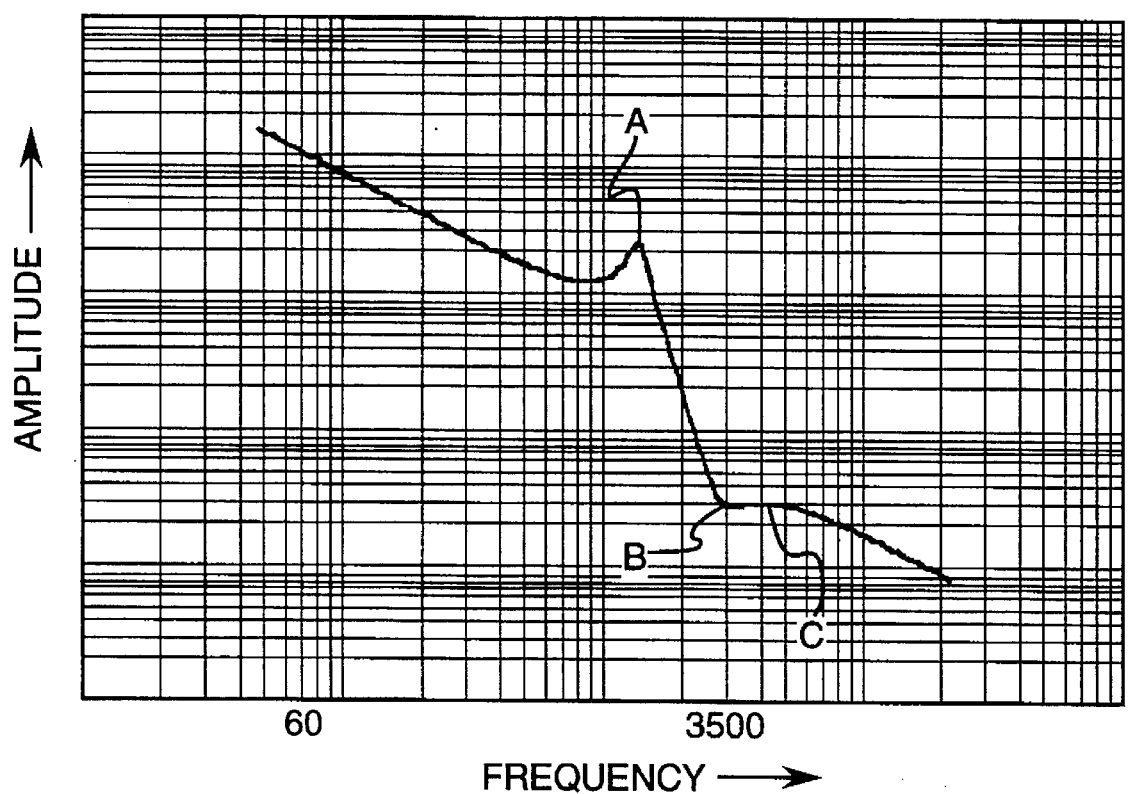
FIG. 5 is a graph of an expected transfer function representing the output current in dependency of the input voltage as a function of frequency for the circuit diagram of FIG. 4.

FIG. 5 is a graph of an expected transfer function representing the amplitude of the output current in dependency of the input voltage (produced by the switches) as a function of frequency. Preferably the pole and zero point of the transfer point is designed to be as far away from the fundamental frequency (e.g. 50 Hz or 60 Hz) as possible and at the same time to be as effective as possible with the damped pole to suppress the switching frequency (i.e. 3500 Hz) and higher harmonics.

The graph was modeled with a computer simulation using the circuit diagram of FIG. 4 with the inductance of each of inductors 14, 38, and 58 being 100 microhenrys, the inductance of each of inductors 16, 40, and 60 being 25 microhenrys, the inductance of each of inductors 18, 46, and 52 being 8.2 microhenrys, the capacitance of each of capacitors 20, 48, and 54 being 20 microfarads, and the resistance of each of resistors 22, 50, and 56 being 0.3 ohms.

The first amplitude deviation (represented by peak A) results from capacitors 20, 48, and 54. The resistances of resistors 22, 50, and 56 determine the location of the second amplitude deviation (represented by point B). Without the resistor, the amplitude would continue to drop sharply. The values of the capacitors, resistors, and inductors are chosen so that the trap (represented by relatively flat portion C) remains substantially flat. This is advantageous in comparison to the approach taken by aforementioned Bernard et al. in Power Quality Solutions, wherein the pole is undamped and therefore can be excited by non-linear loads and line harmonics. Under such excitation, the filter of Bernard et al. can generate harmonics by itself.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A filter for a pulse width modulating inverter, the filter comprising:

a first inductor, the first inductor coupled to a phase connection of the pulse width modulating inverter;

a second inductor, the second inductor coupled between the first inductor at a first-second coupling junction and a load;

a series configuration comprising a resistor, a capacitor, and a third inductor coupled in series, the series configuration having one end coupled to the first-second coupling junction.

2. The filter of claim 1, wherein a second end of the series configuration is coupled to a neutral.

3. The filter of claim 2, further including a fourth inductor, the fourth inductor coupled to a second phase connection of the pulse width modulating inverter;

a fifth inductor, the fifth inductor coupled between the fourth inductor at a fourth-fifth coupling junction and the load;

a sixth inductor, the sixth inductor coupled to a third phase connection of the pulse width modulating inverter;

a seventh inductor, the seventh inductor coupled between the sixth inductor at a sixth-seventh coupling junction and the load;

a second series configuration comprising an eighth inductor, a second resistor, and a second capacitor coupled series, the second series configuration having a first end coupled to the fourth-fifth coupling junction and a second end coupled to the neutral; and a third series configuration comprising a ninth inductor, a third resistor, and a third capacitor coupled in series, the third series configuration having a first end coupled to the sixth-seventh coupling junction and a second end coupled to the neutral.

4. The filter of claim 1, further including a fourth inductor, the fourth inductor coupled to a second phase connection of the pulse width modulating inverter;

a fifth inductor, the fifth inductor coupled between the fourth inductor at a fourth-fifth coupling junction and the load; and wherein the series configuration has a second end coupled to the fourth-fifth coupling junction.

5. The filter of claim 4, further including a sixth inductor, the sixth inductor coupled to a third phase connection of the pulse width modulating inverter;

a seventh inductor, the seventh inductor coupled between the sixth inductor at a sixth-seventh coupling junction and the load;

a second series configuration comprising an eighth inductor, a second resistor, and a second capacitor coupled in series, the second series configuration having a first end coupled to the fourth-fifth coupling junction and a second end coupled to the sixth-seventh coupling junction; and a third series configuration comprising a ninth inductor, a third resistor, and a third capacitor coupled in series, the third series configuration having a first end coupled to the sixth-seventh coupling junction and a second end coupled to the first-second coupling junction.

6. A filter for a pulse width modulating inverter, the filter comprising:

a first inductor, the first inductor coupled to a phase connection of the pulse width modulating inverter;

a second inductor, the second inductor coupled between the first inductor at a first-second coupling junction and a load;

a parallel configuration comprising a resistor and a capacitor coupled in parallel and a third inductor coupled in series to the resistor and the capacitor coupled in parallel, the parallel configuration having one end coupled to the first-second coupling junction.

7. The filter of claim 6, wherein a second end of the parallel configuration is coupled to a neutral.

8. The filter of claim 6, further including a fourth inductor, the fourth inductor coupled to a second phase connection of the pulse width modulating inverter;

a fifth inductor, the fifth inductor coupled between the fourth inductor at a fourth-fifth coupling junction and the load; and wherein the parallel configuration has a second end coupled to the fourth-fifth coupling junction.

9. A filter for a pulse width modulating inverter, the filter comprising:

a first inductor, the first inductor coupled between a phase connection of the pulse width modulating inverter and a load;

a series configuration comprising a resistor, a capacitor, and a series inductor coupled in series, the series configuration having one end coupled to the load and a second end coupled to a neutral.

10. A filter for a pulse width modulating inverter, the filter comprising:

a first inductor, the first inductor coupled between a phase connection of the pulse width modulating inverter and a load;

a series configuration comprising a resistor, a capacitor, and a series inductor coupled in series, the series configuration having one end coupled to the load; and an additional inductor, the additional inductor coupled between a second phase connection of the pulse width modulating inverter and the load, wherein the series configuration has a second end coupled to the load.

* * * * *